R. H. POWELL.
INTERNAL COMBUSTION ENGINE.
APPLICATION FILED APR. 20, 1911.
1,029,398.
Patented June 11, 1912.
3 SHEETS—SHEET 3.
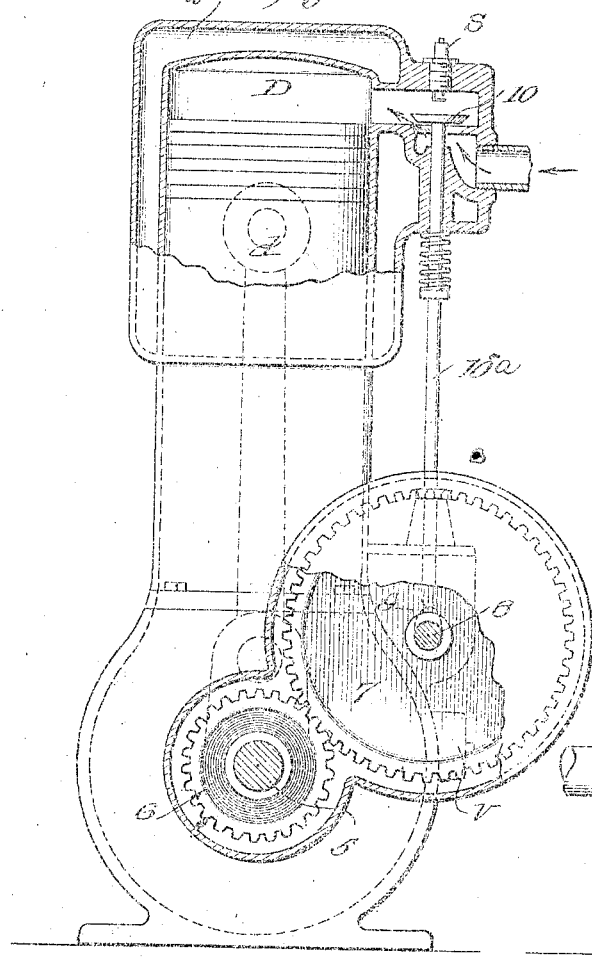
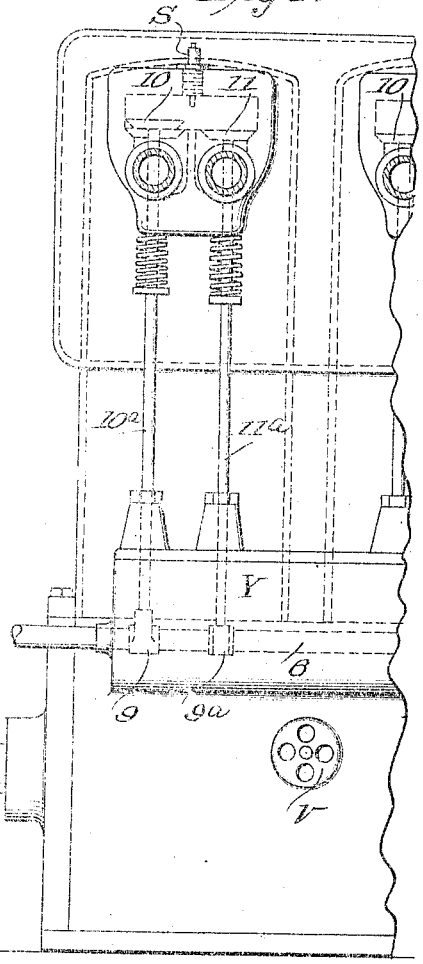
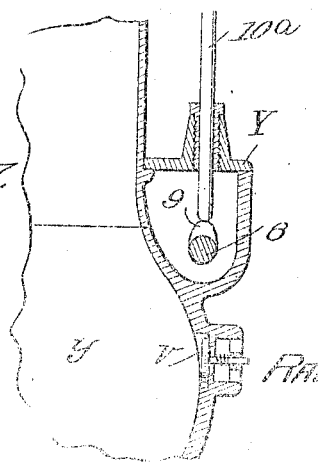
WITNESSES
INVENTOR
Rawley H. Powell
BY Munn & Co.
ATTORNEYS

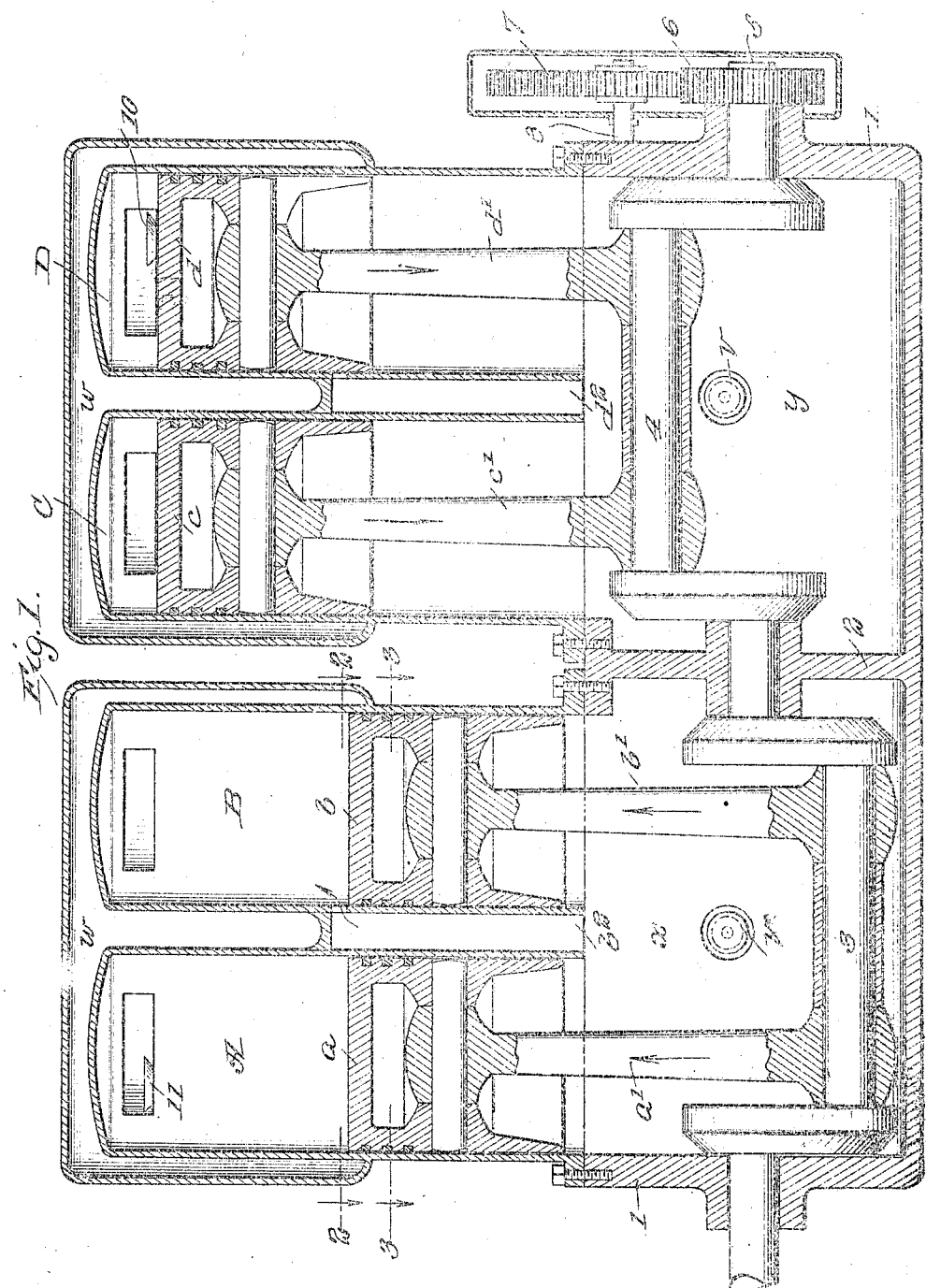

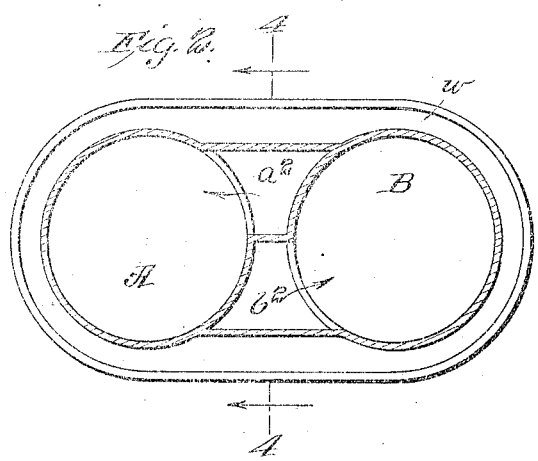
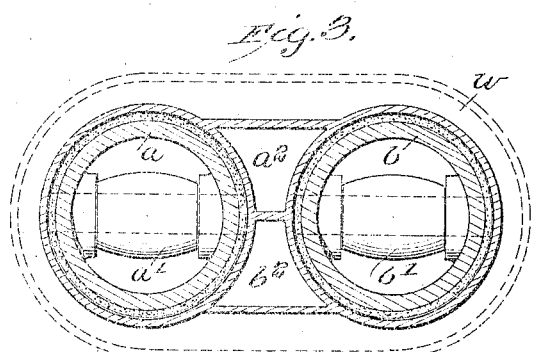
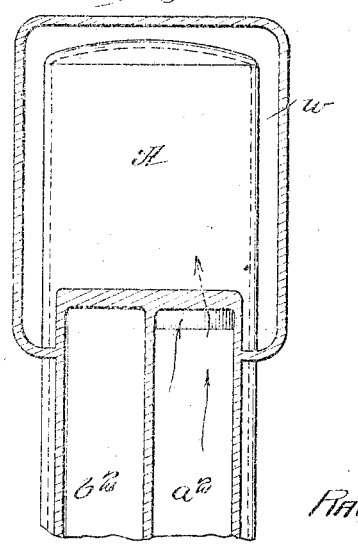

UNITED STATES PATENT OFFICE.

RAWLEY H. POWELL, OF GRAFTON, WEST VIRGINIA.

INTERNAL-COMBUSTION ENGINE.

1,029,398.   Specification of Letters Patent.   Patented June 11, 1912.

Application filed April 20, 1911. Serial No. 622,188.

*To all whom it may concern:*

Be it known that I, RAWLEY H. POWELL, a citizen of the United States, and a resident of Grafton, in the county of Taylor and State of West Virginia, have made certain new and useful Improvements in Internal-Combustion Engines, of which the following is a specification.

My invention relates to improvements in internal combustion engines, and it consists in the combinations, constructions and arrangements herein described and claimed.

An object of my invention is to provide a device by means of which the scavenging of the engine may be effectively accomplished.

A further object of my invention is to provide a device in which a higher compression is secured.

A further object of my invention is to provide means for cooling the piston and the cylinder.

A further object of my invention is to provide a device in which the carbon deposit on the piston and cylinder is reduced to a minimum, due to complete combustion.

A further object of my invention is to provide a device capable of using a longer stroke.

Other objects and advantages will appear in the following specification and the novel features of the invention will be particularly pointed out in the appended claims.

My invention is illustrated in the accompanying drawings forming part of this application in which—

Figure 1 is a longitudinal vertical section through the device, Fig. 2 is a section along the line 2—2 of Fig. 1, Fig. 3 is a section along the line 3—3 of Fig. 1, Fig. 4 is a section along the line 4—4 of Fig. 2, Fig. 5 is an end view of the device, certain parts being shown in section, Fig. 6 is a side view of a portion of the device, and Fig. 7 is a sectional view showing the valve operating mechanism.

In carrying out my invention, I provide a base 1 which is divided by a partition 2, so as to form a pair of crank casings $x$ and $y$. Secured to the base 1 are the engine cylinders. These are cast in pairs as shown, these pairs being designated in the drawing as A B and C D respectively. The cylinders are provided with the respective pistons $a$, $b$, $c$ and $d$. The pistons $a$ and $b$ are connected by means of the piston rods $a'$ and $b'$ with the crank member 3. The latter, it will be observed, is journaled in the walls of the base 1, and is connected with a similar crank member 4 in the crank case $y$. The crank member 4 is disposed at an angle of 180° from the crank member 3, and is connected by means of the piston rods $c'$ and $d'$ with the pistons $c$ and $d$ respectively. As stated before, the cylinders are cast in pairs, the cylinders C and D being precisely of the same construction as the cylinders A and B. A description of the cylinders A and B therefore will suffice. These cylinders are cast so as to provide a pair of by-passes $a^2$ and $b^2$. As will be seen from Fig. 2, the by-pass $a^2$ communicates, at its top, with the cylinder A, while the by-pass $b^2$ communicates with the cylinder B. The usual water jacket such as that shown at $w$ is provided, and it will be noticed that the by-passes $a^2$ and $b^2$ terminate just below that portion of the water jacket which extends between the cylinders. The purpose of this arrangement will be explained later.

The crank member 4 is journaled in the crank case as shown and an extension 5 (see Fig. 1) is provided with a gear 6 which meshes with a gear 7 on a shaft 8. The latter bears a cam 9, which is arranged to engage the lower end of the valve stem $10^a$ of the inlet valve 10 (see Fig. 5). Each cylinder is provided with an inlet valve 10 and an exhaust valve 11. The latter is operated by a cam $9^a$ similar to the cam 9 on the shaft 8. In order to insure the perfect operation of these valves I inclose the shaft 8 in a casing Y. At a convenient place in the crank casing I arrange the inlet valves, such as that shown at V in Fig. 7. The spark plug S is preferably disposed just above the intake valve as shown in the drawings.

From the foregoing description of the various parts of the device, the operation thereof may be readily understood. Let us suppose that the motor has been cranked and that cylinder D is drawing in a charge of mixed gas and air. The intake valve 10 will then be in the position shown in Fig. 5 and the pistons in the cylinders C and D will be in the position shown in Fig. 1. Consider first the action in the cylinder D. As the piston $d$ descends the charge is drawn in and will continue to be drawn in as long as the top of the piston is above the opening of the by-pass which establishes communication between the crank case $y$ and the interior of the cylinder D, this by-pass being precisely similar to that shown at $a^2$ in Figs. 2, 3 and 4. Before the top of the piston reaches the opening of the by-pass $d^2$ into the cylinder D the inlet valve is closed. In the meantime the movements of both of the pistons $c$ and $d$ simultaneously in the same direction produces a compression in the crank case which is greater than that ordinarily produced, since there are two pistons instead of one. Now, when the piston $d$ uncovers the opening of the by-pass the compressed air in the crank case will rush into the cylinder D, so as to equalize the pressure in the crank case and in the cylinder. Ordinarily there would be a slight vacuum in the cylinder D, this vacuum being greater in a cylinder of considerable length, or when the engine is running very fast, since the gases do not have time to enter so as to bring the pressure up to that of the atmospheric pressure. The entrance of the air from the crank case however will not only bring it up to atmospheric pressure, but beyond atmospheric pressure. When the piston $c$ uncovers the opening of the by-pass $c^2$ then the compressed air from the crank case will rush into the cylinder C. The opening of the exhaust valve by means of a cam such as 9 or $9^a$ has just taken place so that the air drives out the gases, thus scavenging the cylinder. A further scavenging takes place on the up stroke of the piston $c$. It will be noted that a large quantity of air is available to scavenge the cylinder because of the fact that the cylinder which is on the intake stroke will require less air to fill it, due to the fact that it is already nearly full of the mixture admitted through the intake valve, and therefore the greater portion of the air will be available to scavenge the companion cylinder. On the up stroke of the piston $d$ the initial charge of gas and air drawn through the intake valve is compressed as well as the air which was admitted from the crank case. The mixture which is drawn into the intake valve is rich in gas, so that the admixture of the air from the crank case brings the proportion of air and gas to the theoretical explosive mixture. Of course, the intake valve and the exhaust valve are both closed on the compression stroke, this being merely a matter of adjustment of the cams on the cam shaft 8. The explosion drives the piston $d$ downwardly and the movement of the piston $c$ sucks in a charge, the intake valve being opened to allow the charge to enter.

The arrangement of the cylinders in pairs connected to a common crank shaft at 180° lends to the steady working of the engine so that vibration is reduced to a minimum.

It will be noted that the following advantages accrue from a device constructed in the manner described. The cylinders of the engine are thoroughly scavenged by a stream of pure cold air under considerable pressure. A greater compression is secured in the explosion chamber. One difficulty encountered in the use of engines having a long stroke is the inability of a piston to draw in a charge fast enough. In other words there is generally a considerable vacuum in the chamber so that on the compression stroke there must be an appreciable movement of the piston to make up for this before there can be any compression at all. In my device this trouble is obviated. The air from the crank case immediately enters the cylinder so that the pressure in the crank case and the cylinder are equalized. Thereafter compression occurs and there is more of the explosive mixture in the cylinder than there would otherwise have been. Therefore to use a longer stroke it is only necessary to feed in a richer fuel supply when the air from the crank case will mix with the latter and not only reduces the vacuum, but will actually bring the charge within the cylinder above atmospheric pressure before compression takes place. The cool air from the crank case is forced into the cylinders thereby keeping the cylinders and piston cool. It will be noted that the richest part of the explosive charge is at the upper end of the cylinder so that when the explosion occurs there is less liability of a carbon deposit on the piston.

The arrangement of the by-passes from the crank case I consider one of the main features of my invention, since it permits an unobstructed flow of air to the cylinders without the use of supplementary valves.

I claim:

1. In an internal combustion engine, a plurality of cylinders arranged in pairs, a crank shaft, a piston for each pair of cylinders connected with said crank shaft, the pistons of adjacent pairs of cylinders being connected to the crank shaft at 180° apart, an individual crank case for each pair of the cylinders, said crank case being in free communication with one end of its pair of cylinders, and a by-pass for each individual cylinder of a pair, between the cylinders of each pair, the walls of said by-passes being integral with the walls of the adjacent cylinders, and said by-passes establishing communication between the cylinders above the pistons and the interior of the crank case.

2. In an internal combustion engine, a pair of cylinders each having an intake and exhaust valve at one end, pistons disposed in said cylinder, a crank case, a common crank shaft, the ends of the cylinders opposite the intake and exhaust valve having free communication with the interior of the crank case when the piston is in its lower position, an individual by-pass for each cylinder disposed between said cylinders, the walls of said by-passes being integral with those of the cylinders on either side thereof, and said by-passes having a common integral wall, an inlet valve for permitting the entrance of air into the crank case, and means for timing the movement of the intake and exhaust valves.

RAWLEY H. POWELL.

Witnesses:
R. S. MIDDLETON,
C. C. RICHMAN.